(12) United States Patent
Han et al.

(10) Patent No.: US 6,866,482 B2
(45) Date of Patent: Mar. 15, 2005

(54) HIGH-PERFORMANCE PROPELLER

(76) Inventors: Wei Han, Room 401, East Unit, Building 1, No. 8 Shantou Road, Shinan District, Qingdao City, Shandong 266071 (CN); Yuanling Li, Room 102, East Unit, Building 4, No. 161, Yanji Road, Qingdao City, Shandong 266071 (CN); Lianyun Sun, No. 11, First Road, Xiaogang, Qingdao City, Shandong 2660071 (CN)

( * ) Notice: Subject to any disclaimer, the term of this patent is extended or adjusted under 35 U.S.C. 154(b) by 0 days.

(21) Appl. No.: 10/204,984
(22) PCT Filed: Feb. 5, 2001
(86) PCT No.: PCT/CN01/00112

§ 371 (c)(1),
(2), (4) Date: Nov. 19, 2002

(87) PCT Pub. No.: WO01/64510
    PCT Pub. Date: Sep. 7, 2001

(65) Prior Publication Data
    US 2003/0118446 A1 Jun. 26, 2003

(30) Foreign Application Priority Data
    Feb. 29, 2000 (CN) .................................. 00213631 U

(51) Int. Cl.$^7$ ........................... B64C 11/18; B63H 1/26; F04D 29/18
(52) U.S. Cl. ....................................... 416/195; 416/228
(58) Field of Search .................. 416/228, 189, 416/190, 191, 195, 236 A, 236 R

(56) References Cited

U.S. PATENT DOCUMENTS

| | | | |
|---|---|---|---|
| 1,597,175 A | * 8/1926 | Boening | 416/235 |
| 2,426,742 A | * 9/1947 | Pawlowski | 416/189 |
| 4,093,402 A | * 6/1978 | Van Holten | 416/236 A |
| 4,180,372 A | 12/1979 | Lippert, Jr. | |
| 4,288,223 A | * 9/1981 | Gonzalez et al. | 440/71 |
| 4,664,593 A | 5/1987 | Hayashi et al. | |
| 5,096,382 A | 3/1992 | Gratzer | |
| 5,405,243 A | 4/1995 | Hurley et al. | |
| 6,352,408 B1 | * 3/2002 | Kilian | 416/191 |

FOREIGN PATENT DOCUMENTS

CN        2210854 Y        10/1995

* cited by examiner

Primary Examiner—Edward K. Look
Assistant Examiner—Richard A Edgar
(74) Attorney, Agent, or Firm—Senniger Powers

(57) ABSTRACT

A high-performance propeller has one hub and a plurality of blades, characterized in that a double-side or a single-side arc brim is provided at the tip of each blade. The propeller of the invention can provide a small induced drag and convert the centrifugal force to the effective force so as is to increase the differential pressure near the tip of blades and thereby increase the acting force on blades. Under the condition of same power consumption, it has been tested for the large propeller in the type of lateral inclination that the amount of flow is increased about 12%~17%, which is equivalent to save energy 40%~70%. Since the fluid dynamic performance presents the aspect ratio approaching infinity, the width of the blades can be increased whereas the induced drag is not increased. Applying the method of increasing the area of the blades and decreasing the velocity of outflow fluid, the effect on saving of energy can be further improved greatly on the present basis.

10 Claims, 2 Drawing Sheets

HIGH-PERFORMANCE PROPELLER

TECHNICAL FIELD

The invention relates to a propeller, particularly to a propeller with the blades provided with double-side or single-side arc brims at the tips thereof.

BACKGROUND ART

For the blades of the propeller in the art, due to the effect of induced drag the maximum pressure point is located at the place of about 0.7 of blade length where is the main operational region. The movement velocity of blades arrives to maximum in the region from the place of 0.7 blade length to the tip of blade, which region occupies about half of entire rotational area of propeller and should produce about 70% acting force in terms to the calculation of the deserved acting force. For the conventional propeller, the differential pressure between the positive-pressure face and the negative-pressure face in this region decreases instead and almost to zero at the tip of blade. The tip of blade is located at the position of maximum movement velocity of blades, but also the position of maximum loss of energy in conventional propeller. There are no stable boundaries between the positive-pressure face and the negative-pressure face of the blade of propeller in the art and between these pressure faces and surrounding medium, thereby the loss of energy at the tip of blade is serious. Presently there is a design in which a brim is added to the blade with relatively big aspect ratio, but the beneficial result of saving energy is not obvious. This is because the induced drag of blade itself is relatively smaller, the blade span is longer arm of force is long, and thereby the moment is big so as to deform the blade easily, which is easy to cause great form drag by the brim. Presently the design in which the blade is provided with a brim, or the design in which the propeller has a outer ring in the shape of tunnel, and or the application of propeller in the tunnel have basically not considered the influence of the brim or tunnel on radial supplement of fluid. The shape and size of the brim not give consideration to both the elimination of induced drag and the increase of radial supplement of fluid. The brim or tunnel influences the supplement of fluid and thereby reduces the amount of fluid acting on propeller, so that the effective acting force produced by the propeller is decreased and consequently the efficiency of propeller drops.

DISCLOSURE OF THE INVENTION

The objective of the invention is to provide a high-performance propeller, which can overcome the disadvantages of the propeller in the art as described above.

The propeller according to the invention has one hub and a plurality of blades, characterized in that a double-side or a single-side arc brim is provided at the tip of each blade.

The propeller of the invention can change the flow condition and the pressure distribution near the tip of blade by means of the double-side or single-side arc brims. Therefore the fluid dynamic performance of the propeller of the invention presents the aspect ratio approaching infinity and the small induced drag. The centrifugal force of fluid can be converted to the effective acting force so as to increase the acting force near the tip of blade, whereas there almost no form drag in rotational direction is produced by the double-side or single-side arc brim. Under the condition of almost no induced drag, the beneficial result of reducing loss of energy is obvious by means of lengthening the chord of blade, thereby increasing the area of blade and decreasing the velocity of outward flow of fluid.

BRIEF DESCRIPTION OF THE DRAWINGS

The invention will be further described with reference to accompanying drawings and embodiments as follows.

BEST MODE OF EMBODIMENTS OF THE INVENTION

The terms of 'double-side arc brim and single-side arc brim of blade' is hereafter referred to as simply 'brim' for the purpose of clarification.

Embodiment 1

High-performance propeller in the type of propelling used in air

Figure 1:
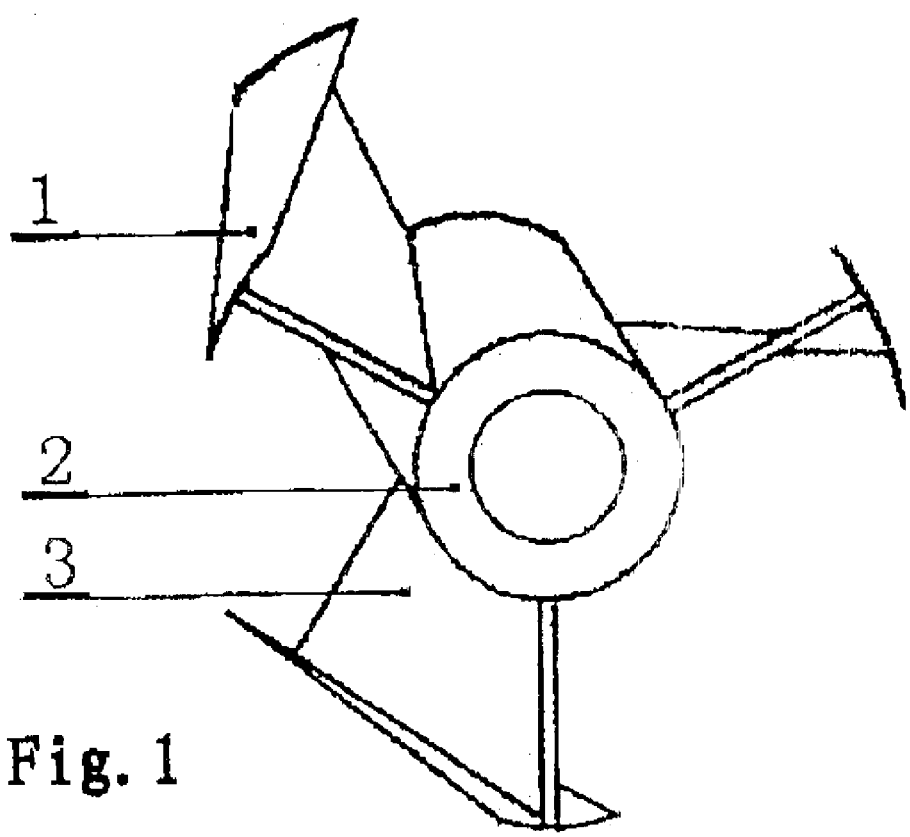
FIG. 1 is a schematic view of the propeller construction and double-side arc brims of the blade according to the invention.
Figure 2:
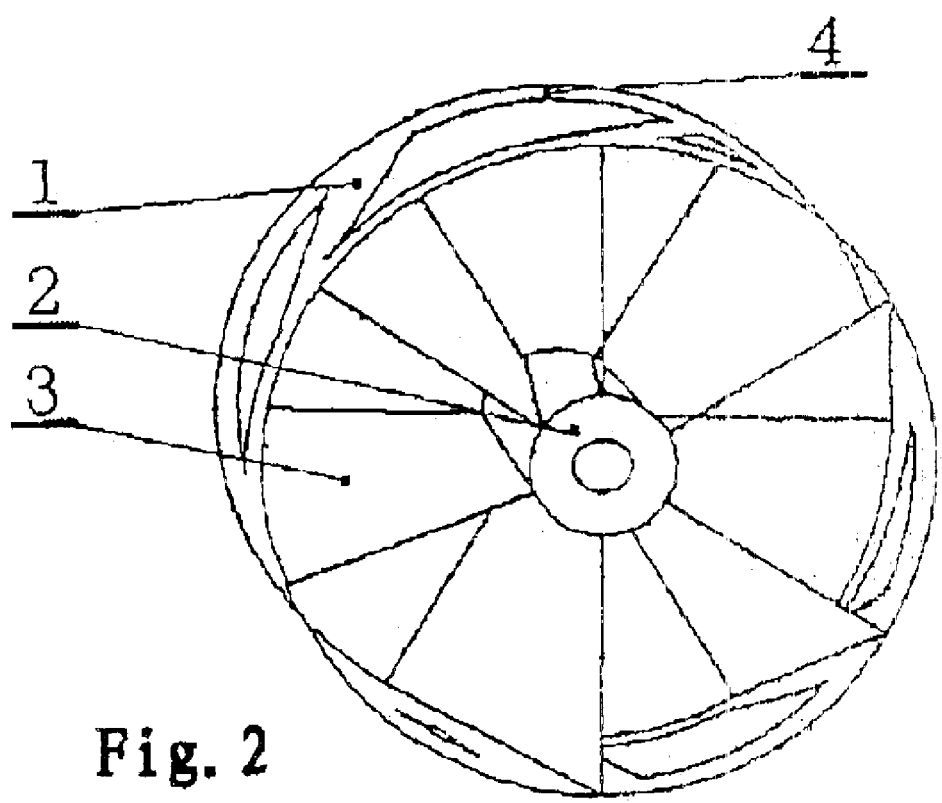
FIG. 2 is a schematic view of the propeller construction of double-side arc brims of the blades with a strengthening ring according to the invention.

Referring to FIGS. 1 and 2, the propeller for this embodiment has a hub 2 and twelve blades 3, characterized in that a double-side arc brim 1 is affixed at the tip of blade 3. A strengthening ring 4 is disposed among the blades. The propeller may be made of any suitable material such as plastic, metal by moulding, welding and other mechanical ways.

For the propeller of this embodiment, the diameter of the propeller is 0.8 m, the effective angle of attack is 14 deg., the lift coefficient L is taken as 1, the aspect ratio is 4, the area of blade is equal to rotational area of propeller, the height of brim is equal to 26% chord length of blade and the brim has a 22 deg. outward inclination. The strengthening ring 4, is located at the tip of the blades and beyond the axial width of blades. The strengthening ring and brim are connected by connecting strips which plane is substantially parallel to the rotational plane of propeller or at an angle to the flow direction so as to produces no acting force but friction drag only.

The static thrust F that can be produced theoretically according to the propeller of the invention is calculated in terms of the technical target of 550 m/s of velocity at the tip of blade, not considering the effect of compressibility of air.

F—thrust, kgf  A—area of the blade, 0.5 m$^2$ r—rotational velocity, 219 rps  $V_{(m)}$—velocity at the tip of blade, 500 m/s L—lift coefficient, 1

$\rho$—air density, 0.125 kg.s$^2$/m$^4$  R—radius, 0.4 m thrust F=0.25 L$\rho$ A $V^2_{(m)}$=4726 kgf=46320 N Calculation of the friction drag Z produced by the brims and strengthening ring:

Comparing with the conventional propeller, the friction drag produced by brims and strengthening ring is added by the propeller of the invention, thus the friction drag Z produced by brims and strengthening ring and the its ratio to thrust are calculated as follows so as to asses its effect.

The friction drag Z produced by brims and strengthening ring is calculated employing the calculation formula for drag of plate. Assuming the shape of brims and strengthening ring only cause the friction drag and the drag is approximate to that of plate, the friction drag is calculated according to the area of brims and strengthening ring which is equal to 50% rotational area at the tip of blade of propeller.

Z—friction drag produced by brims and strengthening ring, kgf $\Re$—Reynolds number M—surface area of brims and strengthening ring, 0.125m$^2$ C—drag coefficient V$_{(m)}$—linear velocity of brim, 550m/s ρ—air density, 0.125kg.s$^2$/m$^4$ γ—viscosity coefficient of air, 1.45×0.00001 m$^2$/s $\Re$=(2.5×550)÷(1.45×0.00001)=94827586

$C=0.455÷(Lg\Re)^{2.58}=0.0021$ $Z=0.5C\rho M\ V^2_{(m)}=0.5\times0.0021\times0.125\times0.125\times550\times550=4.9625 kgf$ The ratio of the friction drag produced by brim and strengthening ring to the thrust is calculated as follows:

drag/thrust=4.9625÷4726=0.00105

Therefore, the effect of the friction drag produced by brims and strengthening ring on the propeller of the invention is insignificant.

Comparison of induced drag loss for the propeller of the invention with that for the conventional propeller is:

1. Calculation of the amount of induced drag loss for the propeller of the invention:

| A—area of propeller, 0.5 m | λ—aspect ratio ≈ ∞ |
|---|---|
| V$_{(m)}$—velocity at the tip of blade, 550 m/s | L—lift coefficient, 1 |

The induced drag coefficient C$_I$ is evaluated as:

$C_I=L^2/(\pi\lambda)=1/(\pi\infty)\approx0$

The induced drag R$_I$ is evaluated as:

$R_I=0.5C_I\rho A\ V^2_{(m)}=0$

2. Calculation of the amount of induced drag loss for the conventional propeller:

| A—area of propeller, 0.5 m | λ—aspect ratio, 4 |
|---|---|
| V$_{(m)}$—velocity at the tip of blade, 550 m/s | L—lift coeffient, 1 |

The induced drag coefficient C$_I$ is evaluated as:

$C_I=L^2/(\pi\lambda)=1/12.6=0.0796$

The induced drag R$_I$ is evaluated as:

$R_I=0.5C_I\rho A\ V^2_{(m)}=752 kgf$

The ratio of induced drag to thrust for the propeller of the invention:

0/4726=0

The ratio of induced drag to thrust for the conventional propeller:

752/4726=0.13

Under this condition, the induced drag loss can be reduced an amount equivalent to 13% thrust for the propeller of the invention.

Embodiment 2

High-performance propeller in the type of propelling with blades having excessively wide chord The propeller for this embodiment has a hub 2 and six blades 3, characterized in that a double-side arc brim 1 is affixed at the tip of each blade 3. For the propeller of this embodiment, the diameter is 0.8 m, the axial length is 0.92m, the angle of attack on the inflow side of blade is 60 deg, the angle of attack on the outflow side of blade is 30 deg. and the aspect ratio is 0.4. The propeller is configured in a helical form in its entirety. The height of brim on the negative-pressure face of blade is 0.03 m. The height of brim on the positive-pressure face of blade is 0.03 m for the inflow side and is 0.08 m for the outflow side. The brim has no any outward inclination. The anti-overflow edge is 0.06 m wide and at a 60 deg. angle to the brim.

Now the propeller of the invention will be compared with that in the turbo-fan engine or compressor having same sucking port area and under same operational condition. The propeller of the invention is characterized in that the fluid can be sucked radially so as to increase the sucking amount of fluid greatly and thus increase the amount of fluid acting on blades. The sucked air on the negative-pressure face of blade will enter the space constituted by the positive-pressure face of blade and the brim as well as the anti-overflow edge so as to be guided and restricted because the positive-pressure face of blade is provided with the brim and the anti-overflow edge. In the course of pressure transition from the negative-pressure face of a blade to the positive-pressure face of next adjacent blade, the interference between the positive and negative-pressure faces of blade can be reduced, and thereby the differential pressure can be increased through the fluid guided in the space between the positive and negative-pressure faces of blade. The flux of fluid for the propeller of the invention is so big that it is capable of converting the centrifugal force to the effective acting force. The effective acting force is increased and the losses of drag and other secondary flow are decreased so as not to be easy to generate panting and flutter of the blades.

m—amount of fluid sucked on the side facing wind for the propeller v—velocity of outward flow of fluid M—amount of radial fluid sucked at the tip of blade for the propeller of the invention F—thrust of the propeller The thrust produced in machine in the type of thrust jet depends mainly on the change of fluid momentum.

The thrust F produced in the conventional thrust fan is:

$F=d(mv)/dt$

Assuming that the amount of fluid sucked on the side facing wind for the propeller of the invention (m) is same as that of the fan with same area facing wind, thus the total amount of flow is (m+M) for propeller of the invention because of supplied radial sucking amount M. Assuming that the velocity of outward flow of fluid (v) is same as (in fact, is larger than) that for the conventional propeller, thus the thrust F produced in the propeller of this embodiment is:

$F=d[(m+V)v]/dt$

Therefore, the thrust produced in the propeller of the invention is larger than that of the conventional fan, such as the fan of the turbo-fan engine with same area facing wind; and the amount sucked is larger than that of jet-engine compressor with same area facing wind. Moreover, the thrust, thrust-weight ratio and efficiency for the engine will increase greatly because of the increased flux of fluid. The propeller of this embodiment is also adapted to used for axial flow pump, smoke exhauster and so on.

Embodiment 3

High-performance propeller for the conventional fan

This embodiment is compared with the conventional fan with 400 mm diameter. The construction, shape, size and angle of attack for the propeller of the invention is same as those of the conventional fan except that the blade is provided with single-side arc brim 5, as shown is FIGS. 3, 4 and 5.

Figure 3:
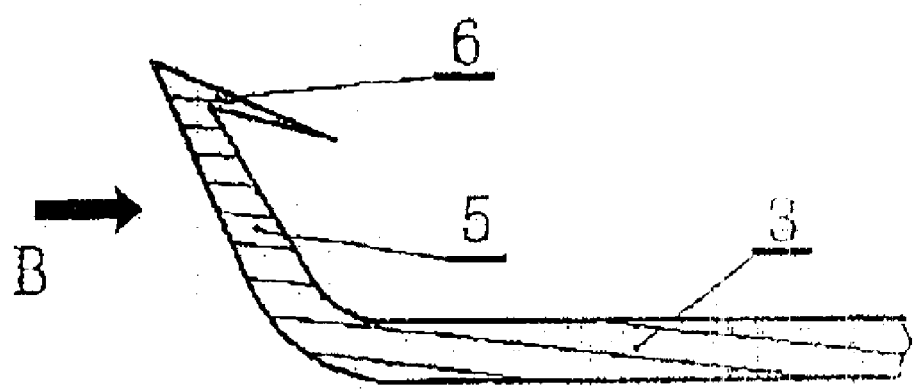
FIG. 3 is a schematic view of a single-side arc brim with outward inclination and an anti-overflow edge.
Figure 4:
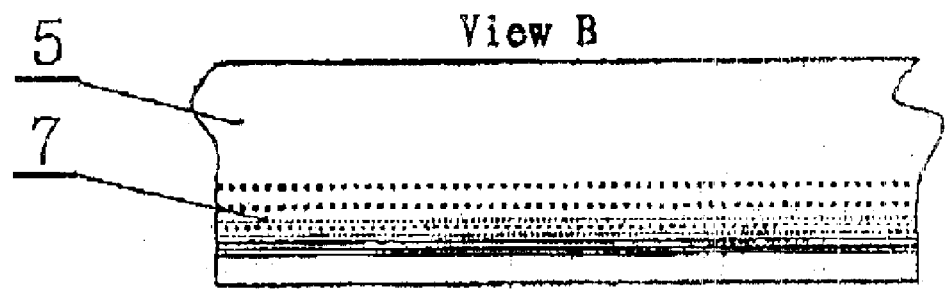
FIG. 4 is a schematic view showing the position of a vortex-generated zone.
Figure 5:
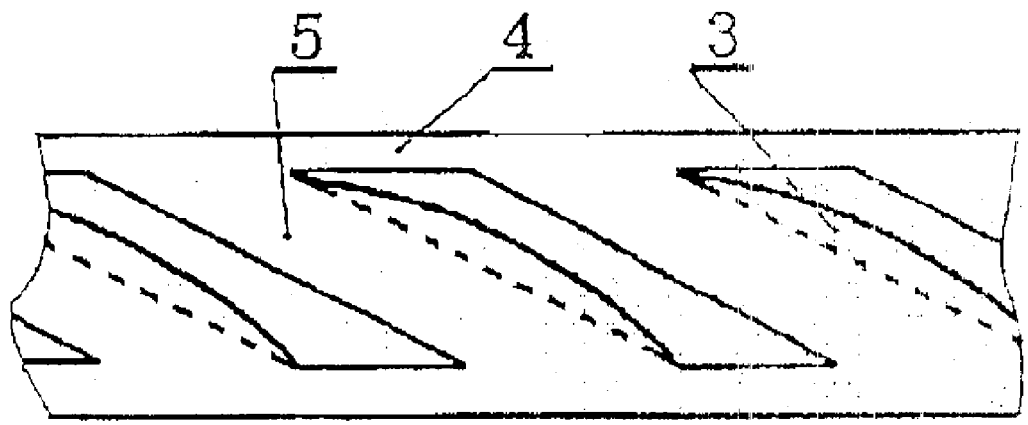
FIG. 5 is a schematic developed view showing the tips of single-side arc brims of blades of propeller with a strengthening ring according to the invention.

The propeller for this embodiment has a hub 2 and four blades 3, characterized in that a single-side arc brim 5 is affixed at the tip of each blade 3. The width of brim is 40 mm, brim has 15 deg. outward inclination, and the equivalent diameter of fan is 420 mm. The juncture and its nearby region between the brim and the tip of negative-pressure face of blade is in the shape of non-streamline arc on which there is a 6 mm wide vortex-generated zone 7 as shown in FIG. 3 and FIG. 4.

The equivalent diameter of fan of this embodiment is 420 mm. Under the condition of same rotational velocity, the drag is equivalent to that of the 400 mm conventional fan, the power is equivalent to that of the 400 mm conventional fan, and the amount of wind produced is larger than that of 420 mm fan.

Presently the testing has proved that under the condition of constant motor power and energy consumption, the propeller of the invention increases the amount of wind about 12%~17%, which is equivalent to save energy about 40~70% in terms of the cubic relationship between the amount of wind and consumption power.

Each part of brim of the propeller of the invention is substantially concentric with the propeller. The parts of brim, which serve the same function, project axially on the roughly same radius of revolution. In principle only the friction drag is required to be produced in rotational direction from the brims. If the brim has an inclination, it will produce the form drag, which can increases or decreases the form force from the pressure at the tip of blade. As required, the brim can develop suitably in the rotational direction of the blade into the form of an approximate involute so as to change the sucked amount of fluid and thereby the result of blade action.

The propeller of the invention is not very sensitive to the change of the inclination of the brim in a certain extent, thus can be used as a propeller with variable pitch. The propeller can be also designed as one with brims in special shape so as to meet the needs in various operational conditions and the requirement in aesthetics.

The invention involves a new design conception and a novel design ideology. In past, it may be not noticed that the radial supplement of fluid at the tip of blade of the propeller can affect the operational condition of propeller. Therefore, no systematic guiding ideology and design conception can be found when the propeller with brims or the propeller within a tunnel is employed, thus it seems to be carried out very blindly. Our experiments and testing have proved that the design of improper brims of blades or application of the conventional propeller within a tunnel will reduce the amount of fluid acting on blades, decrease thrust of propeller or conveying amount of fluid, and thereby decrease the efficiency of propeller. Therefore, the design of the brims for the propeller of the invention should consider that the action of brims would decrease both the induced drag and fluid supplement. The reasonable control of the radial fluid flow at the tip of blade can greatly increase the thrust of propeller, the conveying amount of fluid and consequently the efficiency of the propeller. The invention follows the systematic design ideology. The action of brims is utilized to decrease the induced drag. Thus under the condition of almost no induced drag, the aspect ratio is decreased, the deformation of blade is decreased, the effective area of blade is increased, the outflow velocity of fluid is decreased, and the efficiency of propeller is also improved greatly according to the theoretical evaluation. Presently the saved energy (40%~70%) is obtained mainly by the decrease of induced drag.

It is found in experiments that under a certain conditions, the tunnel will give effect to decrease the flux of fluid for the propeller or fan. The propeller of the invention can eliminate this unfavorable effect, and also give favorable effects to cause the tunnel to maintain the pressure and reduce the leakage at tip of blades. The suitable fit of propeller of the invention within the tunnel will greatly improve the effectiveness for conveying the fluid and compressing the air. The propeller of the invention is generally not used within the tunnel in the form of close fit. The propeller should be disposed at the both ends of the tunnel with the outflow or inflow side thereof suitably fitted to one of the ends of the tunnel. The relatively suitable application of the propeller of the invention is in such way that when the fluid is pressed into tunnel, the most part of the propeller is beyond the tunnel and only outflow side thereof interfaces the tunnel; and when the fluid is sucked out the tunnel, the most part of the propeller is within the tunnel and only outflow side thereof faces outward. The tunnel is required to leave space for radial supplement of fluid to the propeller.

The shape, size, spatial angle and spatial position of the brims of blades for the propeller of the invention are mainly determined by calculation and testing evaluation, through the synthetic consideration in terms of various requirements such as for the fluid sucking, decrease of the induced drag, minimization of the friction drag and form drag, and the structural strength. These depend on the specific requirements in use. If the propeller is used to produce thrust and thereby the minimum loss of induced drag is needed, then the brims are provided on both positive and negative-pressure faces and relatively high. If the propeller is used as a fan and thereby the loss of induced drag on negative-pressure face of the blades is not needed to reduced, then no brims are provided on the negative-pressure faces (see FIG. 4). The shape, size, spatial angle and spatial position of the brims of blades for the propeller of the invention depend on the conditions in use such as the effective angle of attack, the loading intensity, the pitch, the aspect ratio, the radius, and the linear velocity at the tip for the blades, the compression coefficient, the density, and the viscosity of fluid, and the deferential pressure between the inflow and outflow, the deferential pressure between the inflow or outflow and surrounding atmosphere, etc.

At the tip of blades, the radial component of the fluid movement is big, the brims of blades give the effect on suppressing both the induced drag and the fluid supplement in radial direction for the propeller. Therefore, The shape, size, spatial angle and spatial position of the brims of blades all influence the acting results.

The brims of blades for the propeller of the invention can have an inclination relative to the axial direction of the propeller (see FIG. 4). The brim on the positive-pressure face of blade may produce four utilizable effects when the inclination of brim changes: (1) if the brim with outward inclination has a radial velocity component acting on fluid being less than the radial velocity of fluid movement, then fluid produces an acting force on the brim including the component that pushes the propeller to rotate and the component that decreases the bending afterward deformation of blade. Under this circumstance, the brim only has a friction drag and no form drag, and increases the inflow amount of fluid owing to outward inclination of brim; (2) if the brim with outward inclination has a radial velocity component acting on fluid being equal to the radial velocity of fluid movement, then the brim produces no acting force on fluid. The brim has also no form drag and increases the inflow amount of fluid owing to outward inclination of brim; (3) if the brim with outward inclination has a radial velocity component acting on fluid being bigger than the radial velocity of fluid movement, then the brim produces a radial acting force on fluid. The brim can further increase the sucking amount of fluid but consumes the energy, and has also a form drag loss; (4) if the brim on the positive-pressure face of blade inclines inward, then the brim improves the effect on preventing fluid from overflow, but the inflow amount of fluid decreases, and a certain induced drag is produced on the outward side of brim. The inward inclination of brim is generally used in conjunction with the outward inclination of brim such as the outward inclination at lower portion of brim and the inward inclination at upper portion near the top edge and otherwise used in special situation such as in helical form. The effect of outward inclination of brim on decreasing of induced drag will be changed from maximum to zero when the outward inclination of brim changes from 0 deg. to 90 deg.

According to the theoretical analysis and testing evaluation, the effect of propeller technique of the invention on energy saving will be relatively obvious when used in the condition of small aspect ratio of blade such as less than two. The effect of the brim is relatively obvious if the inclination of brim, namely the angle included between the brim and the axial direction of the propeller of the invention is less than 45 deg.

For the blade with relatively small aspect ratio, the fluid may overflow beyond the brim to produce induced drag under the actions of centrifugal force and blade pressure when the action of the centrifugal force is strong. If the height of the brim is raised, then the brim may be so high as to impede supplement of fluid. Under this circumstance, an anti-overflow edge 6 (FIG. 3) can be used to reduce the overflow loss of fluid. The anti-overflow edge can be only used for a part of brims near the outflow of blades. The result from the use of anti-overflow edge is successful for axial conveying of fluid in helical form, such as in a smoke exhauster which has both axial action and centrifugal action.

The brims in the propeller of the invention can have different inclination. For example, the outward inclination of brim is bigger at the portion of blade with less pressure and is less at the portion of blade with bigger pressure. Similarly, the height of the brims can be changed according to the needs in different portions.

The angle of inclination of brim on the negative-pressure face of blade can be same as that of brim on the positive-pressure face but inward or different therefrom such as the angle constantly parallel to axial direction of the propeller. The brim on the negative-pressure face generally does not incline outward except for special requirement. The brim inclining inward means that the brim inclines toward the axial direction.

The double-side are brim 1 is generally used to propeller in the type of propelling. The outward side of the brim along the flow path is adapted to be in streamline form. It can increase the supplement amount of fluid, decrease the interference between the adjacent blades, increase the thrust and consequently improve the performance of the propeller.

The single-side arc brim 5 is generally used to propeller in the type of fan. When the brim has outward inclination relative to axial direction of propeller, the streamline arc shape or other shape with low drag along the flow path is adapted to be used in vicinity of the juncture between the outer side of brim and the negative-pressure face of the blade (see FIG. 3). It can further decrease the differential pressure between the negative and positive-pressure faces, reduce the pressure resistance of the brim, increase the supplement amount of fluid, and reduce the energy consumption. In use for relatively high Reynolds number, a vortex-generated zone 7 (see FIG. 4) which is substantially parallel to the negative-pressure face of blade and enable to transfer the flow condition into turbulence should be provided before the arc surface. The vortex-generated zone is located at a certain width of or full surface of brim which is treated as a rough surface or such a shape enabling to transfer the flow condition into turbulance so as to delay the fluid separation and thereby decrease the drag of blades.

In use for relatively high loading intensity and requirement for high structural strength, the propeller of the invention is adapted to be provided with a strengthening ring 4 (see FIGS. 2,5) to joint the adjacent blades or brims together. Between the adjacent blades there may be provided with one or several strengthening rings suitably located at the middle of or end of the blade length. This construction can improve the structural strength and loading capacity of the propeller and diminish the flutter of blades. The strengthening ring (see FIG. 5) or the part thereof can be provided beyond the axial width of blades so as to lessen the obstruction of the strengthening ring to radial sucking of fluid. The strengthening ring also serves to control the flow direction like a tunnel.

The construction that the blade is connected with the brim at an angle for propeller of the invention can improve the resistance against deformation.

The brim, strengthening ring and anti-overflow edge for the propeller of the invention will be in the various shapes of curved faces, cross-sections or a cross-section with a hollow core.

The application scope for the propeller of the invention mainly refers to the vane-wheel machinery which make the work on fluid, such as propeller, fan, axial flow blower, compressor, axial flow smoke exhauster and so on.

What is claimed is:

1. A propeller comprising one hub (2), a plurality of propeller blades (3) and a single-side arc brim (5) or a double-side arc brim (1) fixed on the tip of each blade, characterized in that said single-side arc brim (5) or said double-side arc brim (1) is a concentric arc with the propeller blades, an outline projected in the axial direction by said single-side arc brim (5) or said double-side arc brim (1) is substantially equivalent to the rotation circle of the tip of the propeller blades, and the width of said single-side arc brim (5) or said double-side arc brim (1) is the same as or less than that of each propeller blade (3) at its juncture with the brim.

2. A propeller according to claim 1, characterized in that the outer shape, at the axial direction of the propeller, of said single-side arc brim (5) or said double-side arc brim (1), has an involute form concentric with the propeller.

3. A propeller according to claim 1, characterized in that said brim is fixed to the tip of the blade inclined relative to the axial direction of the propeller.

4. A propeller according to claim 1, characterized in that in vicinity of the juncture of said single-side arc brim (5) with the negative-pressure face of the respective blade, there is formed an arc juncture surface, on which a slotted, scored or surface-roughened vortex-generated zone is provided to make fluid flowing over it turbulent.

5. A propeller according to claim 4, characterized in that said arc juncture surface is a streamline arc surface, on which a slotted, scored or surface-roughened vortex-generated zone is provided to make the fluid flowing over it turbulent.

6. A propeller according to claim 1, characterized in that said single-side arc brim (5) or said double-side arc brim (1) is provided, on the inner side on a postive-pressure face on the blade, with an anti-overflow edge for preventing fluid from flowing over it.

7. A propeller according to claim 1, characterized in that the angle included between said single-side arc brim (5) or double-side arc brim (1) and the axial direction of propeller is less than 45 deg.

8. A propeller according to claim 2, characterized in that said brim is fixed to the tip of the blade inclined relative to the axial direction of the propeller.

9. A propeller according to claim 2, characterized in that in vicinity of the juncture of said single-side arc brim (5) with the negative-pressure face of the respective blade, there is formed an arc juncture surface, on which a slotted, scored or surface-roughened vortex-generated zone is provided to make fluid flowing over it turbulent.

10. A propeller according to claim 2, characterized in that said single-side arc brim (5) or said double-side arc brim (1) is provided, on the inner side on a postive-pressure face on the blade, with an anti-overflow edge for preventing fluid from flowing over it.

* * * * *